(12) United States Patent
Bartoli et al.

(10) Patent No.: US 7,334,470 B1
(45) Date of Patent: Feb. 26, 2008

(54) DIGITAL INTERFACE AND RECEIVER FOR TIME-OF-FLIGHT LEVEL MEASUREMENT AND PULSE-ECHO RANGING SYSTEMS

(75) Inventors: Daniel George Bartoli, Peterborough (CA); Robert Campbell Brown, Peterborough (CA)

(73) Assignee: Siemens Milltronics Process Instruments, Inc., Peterborough, Ontario (CA)

( * ) Notice: Subject to any disclaimer, the term of this patent is extended or adjusted under 35 U.S.C. 154(b) by 51 days.

(21) Appl. No.: 10/954,891

(22) Filed: Sep. 30, 2004

(51) Int. Cl.
*G01N 23/00* (2006.01)
*G01N 23/28* (2006.01)

(52) U.S. Cl. .................................................. 73/290 V
(58) Field of Classification Search .............. 73/290 V, 73/290 R
See application file for complete search history.

(56) References Cited

U.S. PATENT DOCUMENTS

| | | | | |
|---|---|---|---|---|
| 4,853,901 A | * | 8/1989 | Barber | ........................ 367/27 |
| 6,621,763 B2 | * | 9/2003 | Lyon | ........................... 367/99 |
| 6,925,870 B2 | * | 8/2005 | Pappas et al. | ............ 73/290 V |
| 7,010,973 B2 | * | 3/2006 | Bartoli et al. | ............. 73/290 V |
| 2005/0072227 A1 | * | 4/2005 | Carter | ...................... 73/290 V |

* cited by examiner

*Primary Examiner*—Hezron Williams
*Assistant Examiner*—Rodney Frank
(74) *Attorney, Agent, or Firm*—Fay Sharpe LLP

(57) ABSTRACT

An digital interface and receiver for time-of-flight level measurement and pulse-echo ranging systems. The level measurement device comprises a controller, a transducer, a transmitter stage, an interface, and a digital receive signal processing module. The transmitter is operatively coupled to the transducer and responsive to the controller for emitting energy pulses directed at the surface of a material contained in a vessel. The interface is operatively coupled to the transducer and includes an analog-to-digital converter for digitizing the energy pulses reflected by the surface. The digital receive signal processing module comprises a plurality of program components for processing the digitized echo pulses and determining a level measurement for the material contained in the vessel.

11 Claims, 3 Drawing Sheets

DIGITAL INTERFACE AND RECEIVER FOR TIME-OF-FLIGHT LEVEL MEASUREMENT AND PULSE-ECHO RANGING SYSTEMS

FIELD OF THE INVENTION

The present invention relates to time-of-flight ranging or pulse-echo ranging systems and, in particular, to a digital interface and receiver for pulse-echo ranging systems.

BACKGROUND OF THE INVENTION

Pulse-echo acoustic ranging systems, also known as time-of-flight ranging systems, are commonly used in level measurement applications. Pulse-echo acoustic ranging systems determine the distance to a target or reflector (i.e. reflective surface) by measuring how long after transmission of a burst of energy pulses the echo or reflected pulses are received. Such systems typically use ultrasonic pulses or pulse radar signals.

Pulse-echo acoustic ranging systems generally include a transducer, an analog receiver circuit and a signal processor. The transducer serves the dual role of transmitting and receiving the energy pulses. The analog receiver comprises a buffer/amplifier stage, an attenuator stage, a bandpass filter stage, a logarithmic amplifier and non-linear converter stage. The analog receiver amplifies, conditions and filters the output (i.e. receive or reflected echo pulse signals) from the transducer and the filtered receive echo pulse signals are then converted into digital signals using an analog-to-digital converter (ADC) coupled to an input port on the signal processor. The signal processor executes software functions (e.g. firmware) for generating an echo profile which is then used for detecting and calculating the distance or range of the object based on the transmit times of the transmitted and reflected energy pulses.

Since the transmitted energy pulses are converted into distance measurements, any timing errors arising in the analog receiver of the device result in distance measurement errors which degrade the accuracy of the level measurements. In most cases, errors arise due to temperature changes or temperature effects. Timing errors are a result of temperature drift and drift over time in the operating characteristics of the electronics in the circuitry, for example, analog receiver. It is necessary to re-tune or recalibrate time-of-flight ranging systems not only at installation, but on a periodic basis as well in order to ensure accurate level measurements.

The design and implementation of analog circuitry in time-of-flight ranging or pulse-echo level measurement systems typically involves numerous hardware and circuit components which leads to increased component and product costs, manufacturing and assembly cost, and testing/calibration costs. Such implementations also tend to consume more power.

Accordingly, there remains a need for a novel approach and improvements in the design of pulse-echo or time-of-flight ranging systems.

BRIEF SUMMARY OF THE INVENTION

The present invention provides a time-of-flight range system or pulse-echo level measurement system having a digital interface and receiver.

In one aspect, the present invention provides a level measurement apparatus for measuring a distance to a material having a surface, the level measurement apparatus comprises: a transducer for emitting energy pulses and detecting energy pulses reflected by the surface of the material; a controller operating under stored program control; a transmitter, the transmitter is operatively coupled to the controller; a receiver interface, the receiver interface is operatively coupled to the controller; the stored program includes a receive signal processing module; the transducer is operatively coupled to the transmitter and responsive to the transmitter for emitting the energy pulses, and the receiver interface is operatively coupled to the transducer for receiving reflected energy pulses coupled by the transducer; a converter coupled to the receiver interface, the converter is responsive to the receive signal processing module for converting the reflected energy pulses into digital data and storing the digital data in memory, the memory is accessible by the controller; the receive signal processing module includes a processing component for calculating the distance to the surface of material based on the digital data.

In another aspect, the present invention provides an apparatus for performing level measurements of a material contained a vessel and having a surface, the apparatus comprises: means for emitting energy pulses and detecting energy pulses reflected by the surface of the material; means for converting the reflected energy pulses into digital data; controller means operating under programmable control means; the means for emitting being operatively coupled and responsive to the controller means; the means for converting being operatively coupled and responsive to the controller means; the programmable control means including receive signal processing means; the receive signal processing means including processing means for calculating the distance to the surface of material based on said digital data.

In a further aspect, the present invention provides a receive module for a level measurement system, the level measurement system has a transducer and a controller, the transducer is operatively coupled to the controller for emitting transmit pulses towards the surface of a material contained in a vessel, and the transducer is responsive to echo pulses reflected by the surface of the material, the receive module comprises: an interface component, the interface component has an input coupled to an output on the transducer for receiving signals corresponding to the echo pulses; an analog-to-digital converter, coupled to the interface component, for converting the signals corresponding to the echo pulses into digital data; and a digital signal processing program module, the digital signal processing program module is stored in memory accessible by the controller, and the digital signal processing program module controls operation of the controller for processing the digital data and determining a level measurement for the material contained in the vessel.

Other aspects and features of the present invention will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present invention, and in which.

Similar reference numerals are used in different figures to denote similar components.

DETAILED DESCRIPTION OF THE EMBODIMENTS

Figure 1:
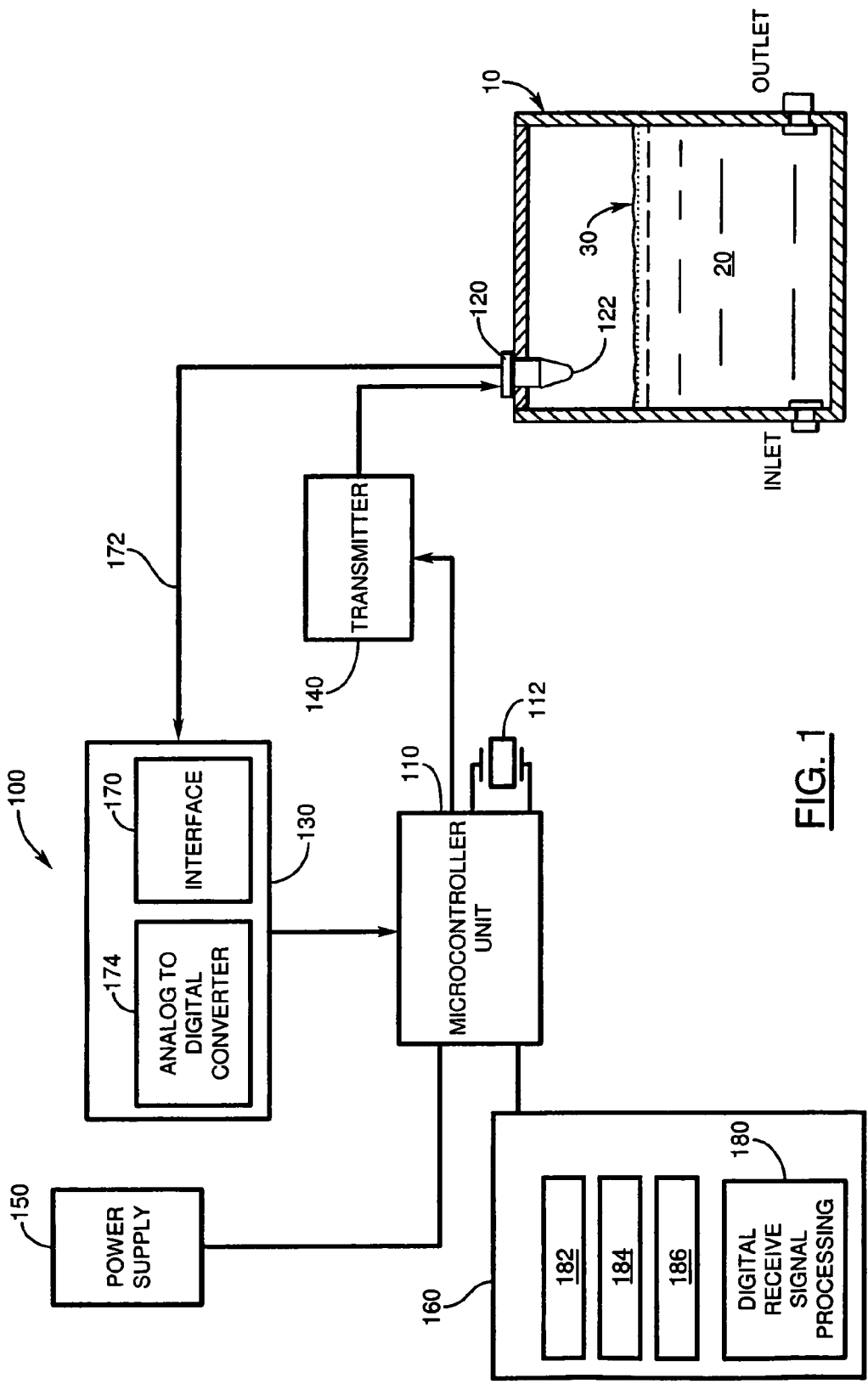
FIG. 1 shows a block diagram of an embodiment of a pulse-echo ranging system in accordance with the present invention.

Reference is first made to FIG. 1, which shows a time-of-flight ranging or pulse-echo level measurement system 100 in accordance with the present invention.

As shown in FIG. 1, the pulse-echo level measurement system 100 is installed in a vessel 10, e.g. a storage tank, containing a material 20, for example, a liquid, sludge or granular material, having a level determined by the top surface of the material 20. The top surface of the material 20 provides a reflective surface or reflector, indicated by reference 30, which reflects pulses (e.g. ultrasonic pulses or radar energy bursts emitted by a transducer).

The pulse-echo level measurement system 100 includes a controller or signal processor unit 110, a transducer 120, a receiver module 130, a transmitter stage 140 and a power supply unit 150. In other implementations, the power supply 150 may be replaced by a loop powered interface (not shown).

The controller 110, for example a microprocessor, executes a computer program, for example stored in program memory as firmware indicated by block 160. The computer program or firmware program module 160 provides the functionality associated with the level measurement operations and the digital interface and receiver as described in more detail below. The microprocessor 110 includes an oscillator 112 for establishing an accurate sampling time base. The receiver module 130 comprises an interface component or circuit 170. The firmware program module 160 includes a digital receive signal processing module 180. In addition, the firmware program module 160 includes a functional module 182 for controlling the transmitter stage 140 to emit energy (e.g. ultrasonic) pulses from the transducer 120, a communication interface module 184, and a user interface module 186.

The digital receive signal processing module 180 may be implemented as a program component or module in the firmware module 160. The receiver module 130 has an input port 172 coupled to the output of the transducer 120. The receiver module 130 includes an analog-to-digital converter or A/D converter 174. The A/D converter 174 converts the receive echo signals outputted by the transducer 120 into digital signals which are then processed by the digital receive signal processing module 180. As will be described in more detail below, the digital receive signal processing module 180 process the digitized receive echo signals to determine level measurements. In one embodiment, the digital receive signal processing module 180 is implemented in firmware or software which is executed by the microprocessor 110, as described in more detail below. In another embodiment, the digital receive signal processing module 180 comprises a separate microprocessor or microcontroller which performs some or all of the functions associated with the digital receive signal processing and then transfers or communicates these calculations or results to the microprocessor operating as the controller 110, i.e. a master slave arrangement.

The transducer 120 is responsive to signals applied to the transmitter module 140 by the controller 110 and emits a transmit pulse or energy burst directed at to the surface 30 of the material 20 to be measured. The surface 30 reflects the transmit energy burst and the reflected energy pulses are coupled by the transducer 120 and converted into electrical signals. The electrical signals from the transducer 120 are coupled or applied to the interface 170, and then sampled and digitized by the A/D converter 174 under the control of the digital receive signal processing module 180.

Figure 2:
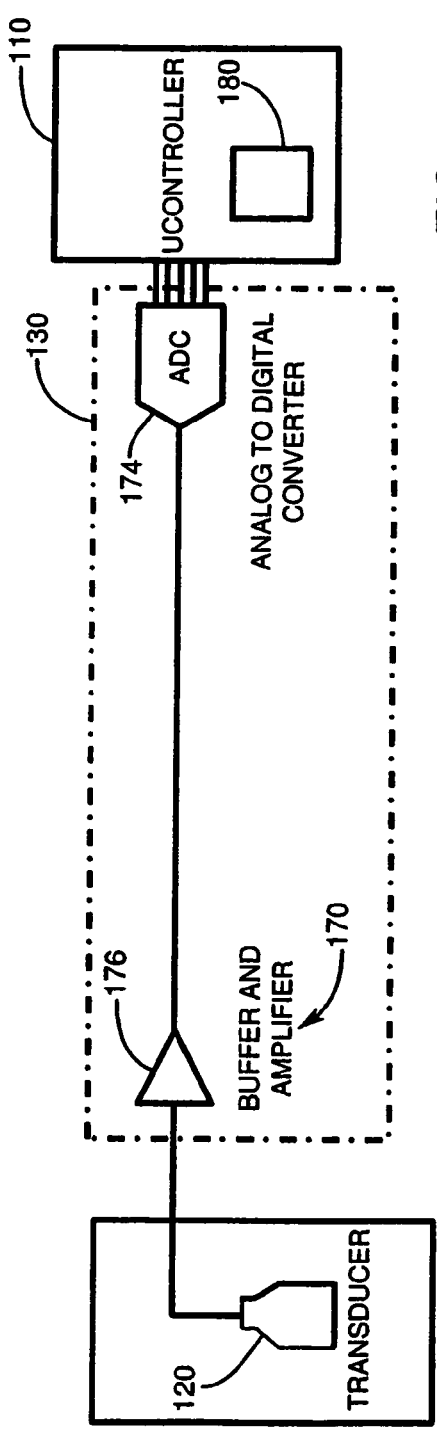
FIG. 2 shows in diagrammatic form an embodiment of a digital pulse-echo ranging system according to the present invention.

Reference is next made to FIG. 2. As shown the interface circuit 170 for the receiver module 130 includes a buffer/amplifier stage 176. The buffer/amplifier stage 176 conditions and/or amplifies the electrical signals outputted by the transducer 120 and corresponding to the receive echo pulses, i.e. ultrasonic or radar pulses reflected by the surface of the material contained in the storage vessel. The buffer/amplifier stage 176 may comprise a buffer (i.e. unity gain amplifier) and one or more other amplifiers (not shown), if the electrical signals from the transducer 120 are to be amplified. The conditioned/amplified signals outputted by the buffer/amplifier stage 176 are applied to the input port on the A/D converter 174. In a typical pulse-echo level measurement application, a dynamic range of about 100 dB is needed. This means that theoretically the A/D converter 174 needs to be at least 17 bits wide. In addition, the A/D converter 174 should be fast enough to provide the required sample resolution. In known manner, the A/D converter 174 may implemented using a single device or component (for example, a 20 bit wide device), or 2 or 3 A/D converters coupled together to provide +17 bits resolution and high speed conversion. The digitized output from the A/D converter 174 is inputted by the controller 110 and processed in the digital receive signal processing module 180 as will now be described in more detail below with reference to FIG. 3.

Figure 3:
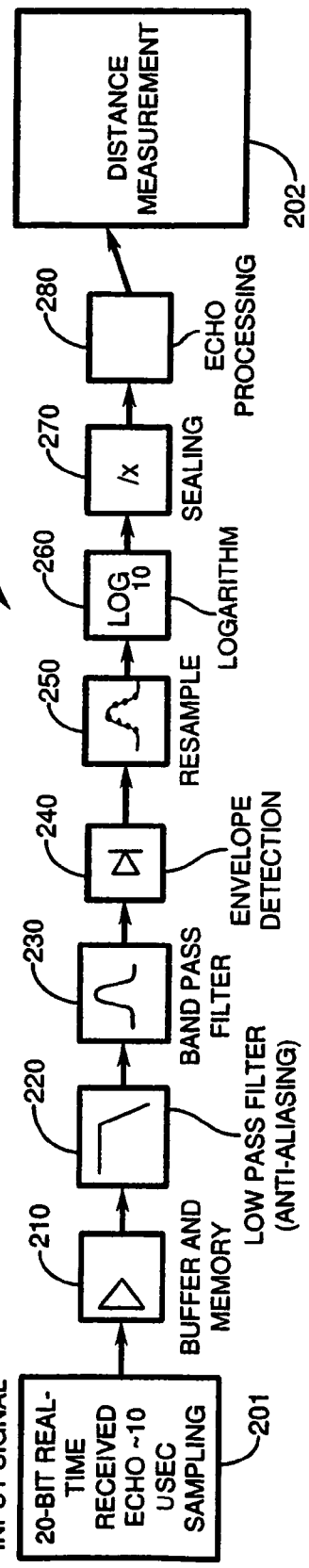
FIG. 3 shows, in block diagram form, a software implementation for the digital pulse-echo ranging system in accordance with another aspect of the present invention.

Referring to FIG. 3, the digital receive signal processing module 180 takes the digitized input signals (represented by block 201) inputted from the A/D converter 174 (FIG. 2) and processes them to generate distance measurement (represented by block 202). The digital receive signal processing module 180 comprises functional modules or program components implemented in firmware or software which is executed by the controller 110 (FIGS. 1 and 2). The digital receive signal processing module 180 comprises a buffer/memory stage 210, a low pass filter stage 220, a bandpass filter stage 230, an envelope detection stage 240, a resample stage 250, a logarithmic amplifier stage 260, a scaling stage 270 and an echo processing stage 280.

The buffer/memory stage 210 comprises a buffer implemented in on-chip memory or memory accessed by the microprocessor 110. The buffer/memory stage 210 may be implemented in firmware to provide partial memory buffering or full memory buffering of the digitized input data or signals 201. If partial memory buffering is utilized, then the remaining program modules or program functions 220 to 280 are executed in "real-time" by the microprocessor 110 (FIG. 2). On the other hand, if full memory buffering is utilized and the digitized signals for an entire capture window are stored in memory, then the remaining program modules or functions 220 to 280 may be executed by the microprocessor 110 on a non real-time basis, for example, asynchronously or on a scheduled basis.

Figure 5:
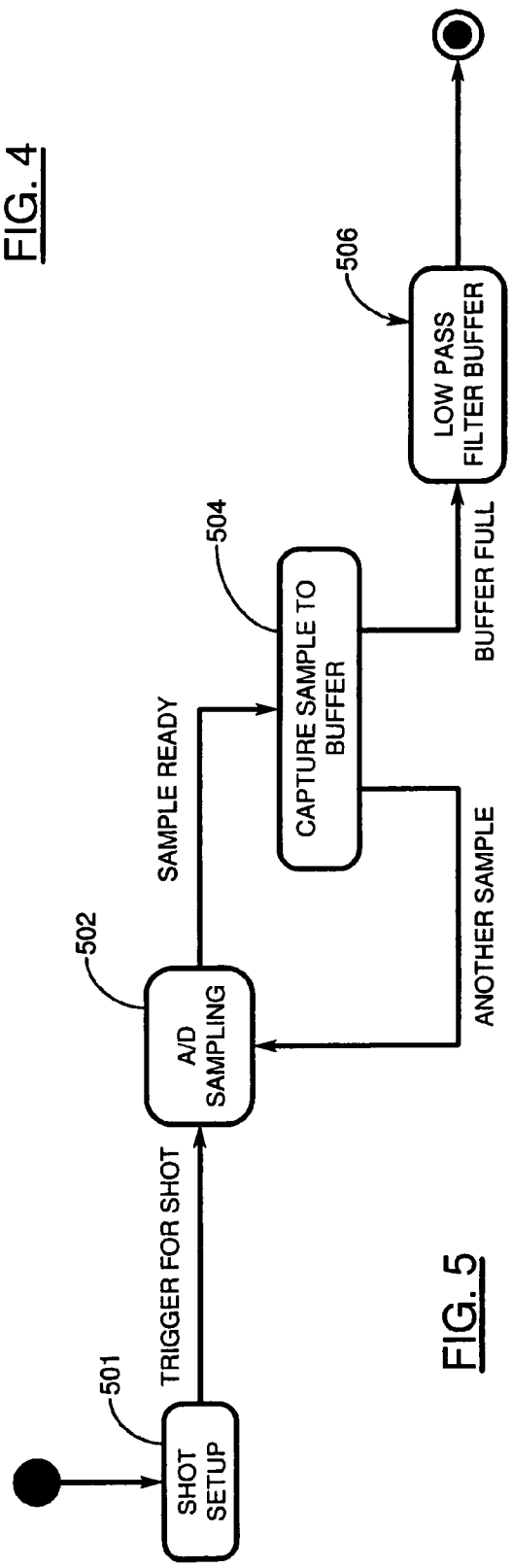
FIG. 5 shows in diagrammatic form an implementation for the buffer and memory storage program module of FIG. 3.

Reference is made to FIG. 5, which shows operation of the buffer/memory stage 210. As shown, the microcontroller 110 (FIG. 1) under firmware control executes a "shot setup" operation 501, i.e. controlling the transmitter stage 140 (FIG. 1) and the transducer 120 (FIG. 1) to emit energy (e.g. ultrasonic) pulses. The receive echo pulses are detected or received by the interface circuit 170 (FIG. 1) and digitized by the A/D converter 174 (FIG. 1) during an A/D sampling operation indicated by reference 502. The digitized sample is stored in memory during a capture sample to buffer operation indicated by reference 504. The digitization and capture operations 502, 504 are repeated until the receive echo pulse(s) corresponding to the transmit burst are digitized and stored in memory, or the memory buffer is filled, for example, using a partial memory buffering approach. Following the buffering operation 504, a low pass filter operation 506 is applied to the data stored in the memory buffer as described in more detail below.

The low pass filter stage 220 functions to filter the digitized receive signals digitized by the A/D converter 174 (FIG. 1) and stored in the memory buffer. The low pass filter stage 220 applies a low pass filter operation to the digitized receive signals to minimize the effects of aliasing. The low pass filter function is implemented in software (firmware) as follows:

$$filterSampleValue = \frac{1}{S} \sum_{n}^{n+(s-1)} sample(n)$$

Where:

n=current Sample number s=sample filter (number of data points to average)

sample=raw value of digitized signal (i.e. from A/D converter)

Using a positive value for the sample filter (s) simulates a low pass filter.

The bandpass filter module 230 applies a bandpass filter function to the low pass filtered output from the low pass filter stage 220. The bandpass filter module 230 processes the low pass filtered digital samples with a center frequency corresponding to the operating frequency for the transducer 120 (FIG. 1). The bandpass filtering together with the low pass filtering serve to reduce the noise in the digitized receive signals and to increase the signal-to-noise ratio (SNR) as high as possible, in order to facilitate the identification of valid echo pulses.

The bandpass filter module 230 utilizes a Finite Impulse filter to obtain the desired frequency output. The Finite Impulse filter may be implemented as follows:

```
SampleValue finiteResponseFilter{
    SampleValue input,
    int numberTaps,
    const Float32 filterCoefficients[ ],
    SampleValue rawSampleHistory[ ])
{
Int16 I;
SampleValue filteedSample = 0;
rawSampleHistory[0] = input;
filteredSample = 0;
for (i=0; I < numberTaps; i++)
```

-continued

```
    {
        filterSample += filterCoefficients[i] * rawSampleHistory[i];
    }
    memmov(rawSampleHistory, &rawSampleHistory[1],
        sizeof(SampleValue)*numberTaps);
    return filterSample;
}
```

Other or additional implementation particulars for the bandpass filter stage 230 will be within the understanding of those skilled in the art.

The envelope detection stage 240 processes the filtered digital samples after the bandpass filter stage 230. The envelope detection stage 240 is implemented to save only the positive envelope of the receive echo signals derived from the digital samples, as the peaks are sufficient to provide the required information for echo identification. The envelope detection stage 240 comprises an algorithm which takes and stores the digital samples corresponding to the peaks of the digitized receive echo signal, and make take the following form:

```
Int16 getPeak(
    SampleValue filteredValues[ ],
    Int16 sampleSize)
{
int16 peakPosition = 0;
int16 position = 0;
SampleValue nextPeak;
// assume starting position is the peak
// continue until the next peak is found, this assumes finding a
valley,
// then the next peak
// find valley
while (filteredValues[position+1] <= filteredValues[position])
    position++;
// now find the peak
nextPeak = filteredValues[position++];
while (filteredValues[position])
    {
    if (nextPeak <= filteredValues[position])
        {
        nextPeak = filteredValues[position];
        peakPosition = position++;
        }
    else
        return peakPosition;
    }
}
```

Following the envelope detection stage 240 and the resample stage 250 (if present or applied), the operation of the logarithm amplifier stage 260 is applied.

The resample stage 250 is applied to resample the detected envelope signal if not all the data samples in the envelope signal are required for the subsequent calculations. The logarithm stage 260 is included to compress the dynamic range of detected envelope signal (or resampled detected envelope signal if the resample operation is applied at stage 250). By compressing the detected envelope signal, a more useable or manageable form is provided for subsequent processing by the echo processing stage 280. In an exemplary implementation, the logarithm stage 260 compresses the digital samples for the envelope signal from 20 bits to 8 bits.

```
#define SAMPLE_SIZE        size of raw frequency buffers
#define PROFILE_SIZE       size of profile
#define DOWN_SAMPLE_SIZE   down sampling rate (0 if no down
                           sampling)
```

```
void getProfileEnvelope(void)
{
// filteredValues array contains only the frequency of interest
// move this into another smaller buffer which contains on the positive
side
// if down sampling is required it is performed in this step
sample = 0;
rawSampleIndex = 0;
nextPeakSampleIndex = 0;
downSampleRate = 0;
while (rawSampleIndex < SAMPLE_SIZE && sample <
PROFILE_SIZE)
  {
  nextPeakSampleIndex = getPeak(&filteredValues[rawSampleIndex],
      (SAMPLE_SIZE - rawSampleIndex));
  // obtain the next profile point (or skip if downsampling)
  if (downSampleRate ++ == DOWN_SAMPLE_SIZE)
     {
     profile[sample++] = logBase10Scaling
        (filterValues[nextPeakSampleIndex]);
     downSampleRate = 0;
     }
  rawSampleIndex = nextPeakSampleIndex + 1;
  }
}
```

Following the logarithm stage 260, the scaling stage 270 is provided to scale the digital samples so that the samples fall into a correct range for the algorithm(s) included in the echo processing stage 280.

Figure 4:
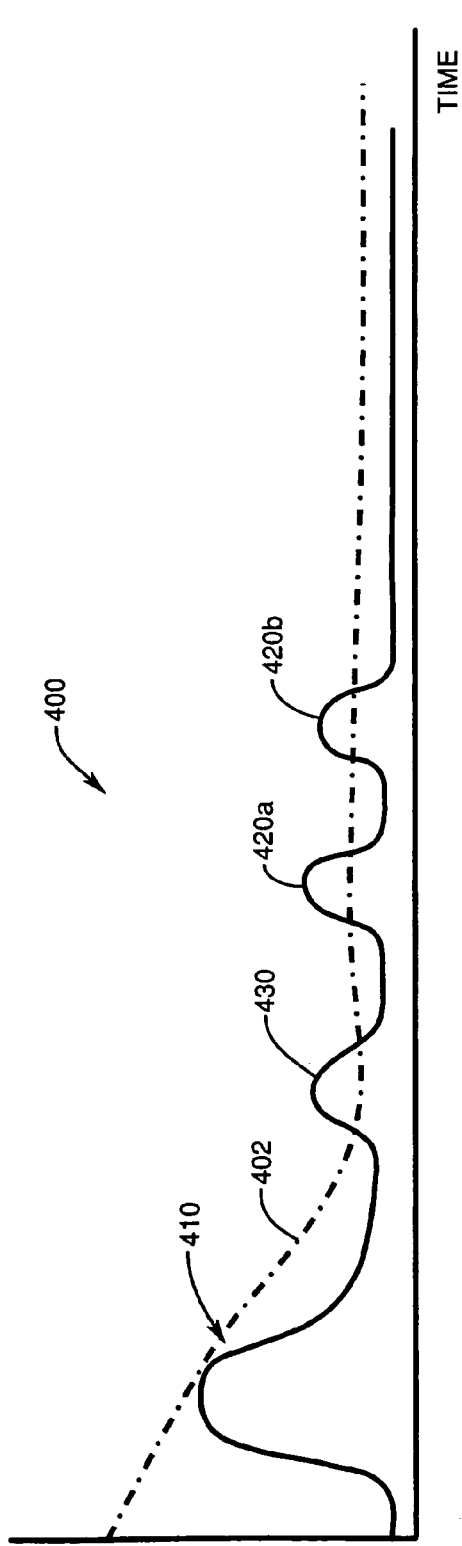
FIG. 4 shows in graphical form an echo profile of the type generated by a pulse-echo ranging system according to the present invention.

The echo processing stage 280 includes an algorithm for generating an echo profile, for example an echo profile 400 as depicted in FIG. 4. The echo profile 400 comprises a half pulse 410 which corresponds to the ring down in the transducer 120 (FIG. 1). The ring down comprises the period during which the transducer 120 is still ringing down from the transmit pulses emitted and as such it is very difficult to detect reflected energy pulses. Following the ring down 410, the echo profile 400 comprises a number of pulses 420, indicated individually as 420a and 420b in FIG. 4. The echo pulses 420a, 420b are identified as valid receive echo pulses, for example, by using a time varying threshold or TVT curve 402. The TVT curve 402 provides a baseline or line on the echo profile 400 which is above the noise level in the echo profile 400. Valid echoes appear above the TVT curve 402. Various algorithms and techniques are known in the art for the generating the TVT curve 402, and the particular implementation for the echo processing stage 280 will be within the understanding of one skilled in the art. Echo pulse(s) 420 falling below the TVT curve 402 are considered to comprise noise. The ring down period 410 also falls underneath the TVT curve 402 and is treated as noise. The echo processing module 280 includes an algorithm which uses the echo profile 400 to calculate the range, i.e. the distance to the reflective surface, from the time it takes for the reflected energy pulse to travel from the reflective surface to the transducer 120. Various known algorithms may be utilized for calculating the range or distance, and the particular implementation details will be familiar to those skilled in the art. From this calculation, the distance to the surface of the liquid and thereby the level of the liquid is determined. The distance measurement 202 (FIG. 3) may be displayed on a display module (not shown) or transferred to a remote computer (not shown) using a communication link, for example, a 4-to-20 mA current loop (not shown).

The controller or signal processor 110 is implemented using a microprocessor or microcontroller, which is suitably programmed to perform these operations and processing steps associated with the program modules or functions 210 to 280 described above. The particular implementation of these program modules and other functions in software or firmware as described above will be within the understanding of those skilled in the art, however, an exemplary implementation is illustrated with the following pseudo code for the main software loop and selected functions (as described above):

```
main {
  waitUntilCollectionComplete( );  // obtain buffer
  antiAliasBuffer( );              // low pass filter
  frequencyExtraction( );          // bandpass filter to filter
                                   // out unwanted frequencies
  getProfileEnvelope( );           // envelope detection, resampling
                                   // and log scaling
  processEcho( );                  // standard echo processing
}
```

It will be appreciated that the digital receive signal processing module 180 according to the present invention not only simplifies the circuit requirements for processing receive echo signals, but provides greater flexibility for processing the receive echo signals and facilitates future changes or functionality upgrades, for example, by replacing the firmware module 160 with new read only memory chip(s) or downloading the new firmware program module 160 to RAM program memory or non-volatile read/writable program memory.

The present invention may be embodied in other specific forms without departing from the spirit or essential characteristics thereof. Certain adaptations and modifications of the invention will be obvious to those skilled in the art. Therefore, the above discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A level measurement apparatus for measuring a distance to a material having a surface, said level measurement apparatus comprising:
   a transducer for emitting energy pulses and detecting energy pulses reflected by the surface of the material, said transducer having an operating frequency;
   a controller operating under stored program control;
   a transmitter, said transmitter being operatively coupled to said controller;
   a receiver interface, said receiver interface being operatively coupled to said controller;
   said stored program including a receive signal processing module;
   said transducer being operatively coupled to said transmitter and responsive to said transmitter for emitting said energy pulses, and said receiver interface being operatively coupled to said transducer for receiving reflected energy pulses coupled by the transducer;

a converter coupled to said receiver interface, said converter being responsive to said receive signal processing module for converting said reflected energy pulses into digital samples and storing said digital samples in memory, said memory being accessible by said controller, and said digital samples providing a digitized echo signal;

said receive signal processing module including a processing component for calculating the distance to the surface of material based on said digitized echo signal, said receive signal processing module comprising a low pass filtering program component, said low pass filtering program component operating to low pass filter a plurality of said digital samples;

said receive signal processing module including a bandpass filtering program component, said bandpass filtering program component operating to apply a band pass filter to a plurality of said digital samples, said band pass filter having a center frequency corresponding to said operating frequency; and, wherein said receive signal processing module includes an envelope detection program component, said envelope detection program component operating to determine an envelope for said digitized echo signal.

2. The level measurement apparatus as claimed in claim 1, wherein said envelope detection program component operates to detect positive peaks in said digitized echo signal.

3. The apparatus as claimed in claim 1, wherein said receive signal processing modules includes a resampling program component, said resampling program component operating to resample digital samples in said envelope.

4. The apparatus as claimed in claim 3, wherein said receive signal processing modules includes a data compression program component, said data compression program component operating to convert the digital samples in said envelope to compressed digital samples.

5. The apparatus as claimed in claim 4, wherein said digital samples comprise 20 bits and said data compression program component converts said digital samples into 8 bit compressed digital samples.

6. The apparatus as claimed in claim 4, wherein said receive signal processing modules includes a scaling program component, said scaling program component operating to apply a scaling factor to said digital samples in said envelope.

7. A receive module for a level measurement system, said level measurement system having a transducer and a controller, said transducer being operatively coupled to said controller for emitting transmit pulses towards the surface of a material contained in a vessel, said transducer having an operating frequency and said transducer being responsive to echo pulses reflected by the surface of said material, said receive module comprising:

an interface component, said interface component having an input coupled to an output on said transducer for receiving signals corresponding to said echo pulses;

an analog-to-digital converter, coupled to said interface component, for converting said signals corresponding to said echo pulses into digital data; and a digital signal processing program module, said digital signal processing program module being stored in memory accessible by said controller, said digital signal processing program module controlling operation of said controller for processing said digital data and including a program component for determining a level measurement for the material contained in the vessel, said digital signal processing program module including a program component for buffering said digital data in the memory accessible by said controller and said digital signal processing program module including a low pass filtering program component, said low pass filtering program component operating to low pass filter said digital data;

said digital signal processing program module including a bandpass filtering program component, said bandpass filtering program component operating to band pass filter said digital data, and said band pass filter having a center frequency corresponding to said operating frequency; and said digital signal processing program module including an envelope detection program component, said envelope detection program component operating to determine an envelope for a digitized echo signal corresponding to said digital data.

8. The receive module as claimed in claim 7, wherein said envelope detection program component operates to detect positive peaks in said digitized echo signal.

9. The receive module as claimed in claim 7, wherein said digital signal processing program module includes a resampling program component, said resampling program component operating to resample digital data in said envelope.

10. The receive module as claimed in claim 9, wherein said digital signal processing program module includes a data compression program component, said data compression program component operating to convert the digital data in said envelope to compressed digital samples.

11. The receive module as claimed in claim 10, wherein said digital signal processing program module includes a scaling program component, said scaling program component operating to apply a scaling factor to said compressed digital samples in said envelope.

* * * * *